(12) United States Patent
Grüter et al.

(10) Patent No.: US 8,505,485 B2
(45) Date of Patent: Aug. 13, 2013

(54) TEAT RUBBER WITH SHOCK-ABSORBING PROPERTIES

(75) Inventors: Thomas Grüter, Lippstadt (DE); Reinhard Frenser, Rheda-Wiedenbrück (DE)

(73) Assignee: GEA Farm Technologies GmbH, Bönen (DE)

( * ) Notice: Subject to any disclaimer, the term of this patent is extended or adjusted under 35 U.S.C. 154(b) by 850 days.

(21) Appl. No.: 12/309,237

(22) PCT Filed: Jul. 10, 2007

(86) PCT No.: PCT/EP2007/006084
§ 371 (c)(1),
(2), (4) Date: Nov. 16, 2009

(87) PCT Pub. No.: WO2008/006539
PCT Pub. Date: Jan. 17, 2008

(65) Prior Publication Data
US 2010/0288199 A1     Nov. 18, 2010

(30) Foreign Application Priority Data

Jul. 10, 2006   (DE) .......................... 10 2006 032 009
Apr. 20, 2007   (DE) .......................... 10 2007 019 191

(51) Int. Cl.
    *A01J 5/04*         (2006.01)
(52) U.S. Cl.
    USPC .................... 119/14.49; 119/14.47; 119/14.01

(58) Field of Classification Search
    USPC .......... 119/14.47–14.54, 14.38, 14.23, 14.02, 119/14.01, 14.22, 14.24, 14.27, 14.31
    IPC ........................................................... A01J 5/04
    See application file for complete search history.

(56) References Cited

U.S. PATENT DOCUMENTS 1,221,654 A * 4/1917 Bartram et al. .............. 119/14.5
1,337,211 A * 4/1920 Eklundh et al. ............ 119/14.49
(Continued)

FOREIGN PATENT DOCUMENTS

| DE | 29 41 150 B | 11/1980 |
| DE | 40 30 767 A1 | 4/1992 |

(Continued)

OTHER PUBLICATIONS

English language Abstract, Translated Description and Claims of WO 2005/070197 A2, European Patent Office's esp@cenet.com database, 3pp.

(Continued)

*Primary Examiner* — Andrea Valenti
(74) *Attorney, Agent, or Firm* — Smith Law Office

(57) ABSTRACT

A teat cup liner for use in a milking cup is disclosed. The teat cup liner has a head with an insertion opening for an animal's teat. Joined to the head is a shaft and a holding rim. The holding rim at least partially surrounds and is spaced apart from the shaft. The teat cup liner holding rim has an inner surface that defines a number of recesses to enhance the durability of the liner. The recesses can be disposed circumferentially around the inner surface of the holding rim, and they can be disposed so that they are in contact with or near an end of the teat cup sleeve.

16 Claims, 5 Drawing Sheets

(56) References Cited

U.S. PATENT DOCUMENTS

Figure 1:
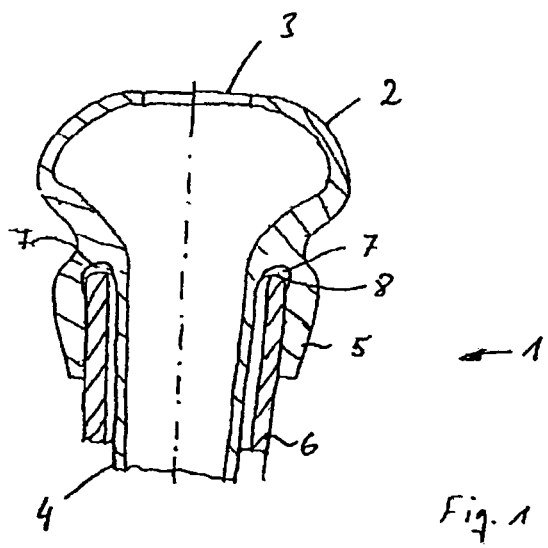

| | | | |
|---|---|---|---|
| 4,320,718 A | 3/1982 | Hoefelmayr et al. | |
| 5,317,988 A * | 6/1994 | Hoefelmayr et al. | 119/14.47 |
| 6,145,471 A * | 11/2000 | Laub-Maier | 119/14.02 |
| 6,202,593 B1 * | 3/2001 | Maier et al. | 119/14.47 |
| 6,755,153 B1 * | 6/2004 | Chowdhury | 119/14.47 |
| 7,578,260 B2 * | 8/2009 | Shin | 119/14.52 |

FOREIGN PATENT DOCUMENTS

| | | |
|---|---|---|
| DE | 196 35 719 A1 | 3/1998 |
| EP | 0 477 950 A1 | 9/1990 |
| GB | 644168 | 10/1950 |
| WO | WO 2005/070197 A2 | 8/2005 |

OTHER PUBLICATIONS

English language Abstract, Translated Description and Claims of DE 40 30 767 A1, European Patent Office's esp@cenet.com database, 5pp.

English language Abstract, Translated Description and Claims of DE 196 35 719 A1, European Patent Office's esp@cenet.com database, 5pp.

English language Abstract, Translated Description and Claims of EP 0 477 950 A1, European Patent Office's esp@cenet.com database, 5pp.

* cited by examiner

TEAT RUBBER WITH SHOCK-ABSORBING PROPERTIES

FIELD AND BACKGROUND OF THE INVENTION

The invention concerns a teat cup liner for use in a milking cup with a head part that has an insertion opening for a teat of an animal and with a shaft part connecting to the head part, as well as a milking cup.

A milking machine that has several milking cups is used for milking an animal, especially a cow, with a machine. As a rule, the milking cups are connected to a collecting unit through milk tubes. The milked milk is transferred to a milk tank from the collecting unit. In connection with the milking of an animal, it is also known that one can use milking cups that are connected directly to a line of the milking system, and in this case a collecting unit is not used.

The milking cup comprises a sleeve in which a teat cup liner is arranged. A teat cup liner, also called molded milking tube, may have different designs. For example, according to WO 2005/070197, a teat cup liner is used on a milking cup with a head part on which a sealing lip is provided that forms an insertion opening for the teat. The head part is connected to a shaft part.

In the predominant majority of the known embodiments of a teat cup liner, this is made of one piece. Since the shaft part of the teat cup liner is brought to into contact with the teat, it is expedient to make the shaft part from a flexible material. Moreover, it is a requirement that the teat cup liner should be able to be cleaned easily and be compatible with the food product, the milk.

A teat cup liner made of a soft material, especially of silicone, has many advantages. However, it was found that, at the pairing of sleeve and teat cup liner, the teat cup liner may become damaged when forces, especially suddenly applied forces, are applied to the head of the teat cup liner. The sleeve is surrounded by a rim of the teat cup liner, through which damage to the teat cup liner may arise. This problem has already been recognized. In order to solve the problem, according to EP 0 477 950 A1, it is proposed that a recess be provided in the part of the holding rim lying opposite to the longitudinal and outward-facing part of the edge of the milking cup. A ring is inserted into the recess which is made of a material other than the material of the teat cup liner. Through this measure, the puncture behavior of the holding rim is supposed to be improved. A teat cup liner with a head part that has a holding rim for encompassing a milking cup sleeve is known from DE 196 35 719. The wall of the head part is stiffened between an insertion opening for the teat and a transition part, in the holding rim region. A part of the teat cup liner head that lies between the stiffened part and the holding rim is made to be elastic, at least partly. An attachable ring is provided on the edge of the milking cup sleeve that faces the head part of the teat cup liner. The ring has an edge that is displaced in the radial direction toward the outside and runs essentially in the longitudinal direction of the milking cup sleeve. An annular recess is provided in the holding rim of the teat cup liner in order to hold the ring.

In such an arrangement, the mounting of the milking cup represents a problem. It involves a not-insignificant expenditure. First the holding ring is placed on the rim of the milking cup. Then the head of the teat cup liner is placed onto the sleeve. Then the sleeve with the holding ring is moved in the direction of the head far enough, so that the lower part of the teat cup liner protrudes from the sleeve.

It is also known that, in order to improve the lifetime of the teat cup liner, the region of the teat cup liner that comes into contact with the edge of the sleeve can be made into a thicker ring. However, this has the disadvantage that the head of the teat cup liner will become correspondingly large, which represents a problem, especially when milking animals whose teats are close together.

SUMMARY OF THE INVENTION

Based on this, the task of the present invention is to further develop the known teat cup liner so that at least the puncturing of the teat cup liner at the edge of the milking cup is avoided as much as possible and the mounting of the teat cup in the sleeve is improved.

The teat cup liner for use on a milking cup according to the invention has a head part with an insertion opening for a teat of an animal. A shaft part is connected to the head part. Below the head part a holding rim is arranged, which surrounds the shaft part at a distance from it. The teat cup liner according to the invention is characterized by the fact that the holding rim in its inner lateral surface has at least one recess, extending essentially in the circumferential direction of the holding rim, preferably the recesses are designed to be opposite the end face of the sleeve. The recesses are arranged essentially at a distance from one another when viewed essentially in the circumferential direction.

When the teat cup liner is connected to the sleeve, the holding rim surrounds an end region of the sleeve and lies against it. The recess is preferably applied in the teat cup liner in such a way that it is covered by the sleeve at least partly. The air located in the recess forms a damping pillow, so that impacts on the teat cup liner are damped. Through this design of the teat cup liner according to the invention it is not absolutely necessary to introduce a protecting ring. Surprisingly it was found that by reducing the material on the holding rim in some locations, the puncture behavior can be improved.

The resistance of the teat cup liner against the action of external forces can be improved even further by providing several recesses, which are arranged at intervals when observing essentially in the circumferential direction of the holding rim. Through the fact that several recesses are provided, the possibility is created that several impact-damping regions are provided on the teat cup liner. Moreover, the material of the teat cup liner may move into the recesses when a force is applied to the teat cup liner, especially to the head part, so that the internal stresses of the teat cup liner are reduced to a range that still lies within the permissible stresses.

In order to simplify the manufacture of the teat cup liner, it is proposed that the recesses be arranged in an equidistant manner to one another. Preferably, the teat cup liner is designed as a component with a rotational symmetry.

When several recesses are provided, it was found to be especially advantageous when the recesses are designed distributed not only on the edge in an essentially circumferential direction, but are also provided displaced in the axial direction with respect to one another. Through this measure, the damping property of the teat cup liner is improved even further.

Hereby, a design in which a first set of recesses and a second set of recesses are provided is especially preferred. The recesses of the first set and the recesses of the second set are displaced with respect to one another in the circumferential direction and in the axial direction in such a way that when viewed in the axial direction, at least one recess of the second set is provided between two neighboring recesses of the first set. As a result of this, not only are the properties of the teat cup liner with regard to damping of the forces acting onto the teat cup liner improved, but also the manufacturing of the teat cup liner according to the invention is simplified. Specifically, the ultimate formability of the teat cup liner is improved. Also, the equipment needed for the manufacture of the teat cup liner can be designed to be relatively simple.

The recesses may be of various form or shape. A design is preferred in which the recesses always have the same shape. Especially preferred is a design of the teat cup liner in which the shape of the recesses is adjusted as a function of the forces acting on the teat cup liner.

According to a further even more advantageous design of the teat cup liner according to the invention, it is proposed that the cross-section of the at least one recess increase toward the head part. Hereby, a design is especially preferred in which the cross-section is essentially triangular. The designation triangular is not meant here in the strict mathematical sense. The triangular shape of the cross-section may also transition into rounded parts.

In order to even further improve the properties of the teat cup liner, it is proposed that the holding rim have at least one insert. Especially preferable is hereby a design in which at least one insert is manufactured with the teat cup liner using a two-component injection process.

According to a further inventive idea, a milking cup is proposed that has a sleeve and a teat cup liner connected to the sleeve. The teat cup liner has a head part with an insertion opening for a teat of an animal. A shaft part is connected to the head part. A holding rim is arranged below the head part that surrounds the shaft part, at a distance to it. The holding rim lies against a region of the sleeve. The holding rim of the teat cup liner has at least one recess in its internal lateral surface that extends essentially in the circumferential direction of the holding rim. The recesses are essentially at a distance to one another when viewed in the circumferential direction of the holding ring.

The invention has numerous advantages. The teat cup liner can be made of a silicone. It is also possible to form the teat cup liner from other elastic materials. Other advantages and details of the invention are explained with the aid of the practical examples shown in the drawing, without the object of the invention being limited to these practical examples.

BRIEF DESCRIPTION OF THE PREFERRED EMBODIMENTS

Figure 2:
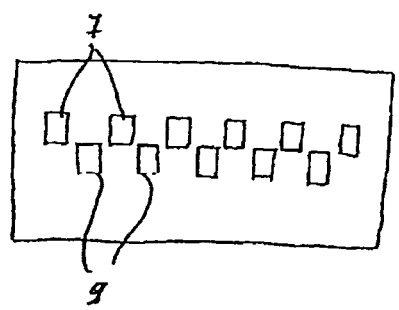
Figure 3:
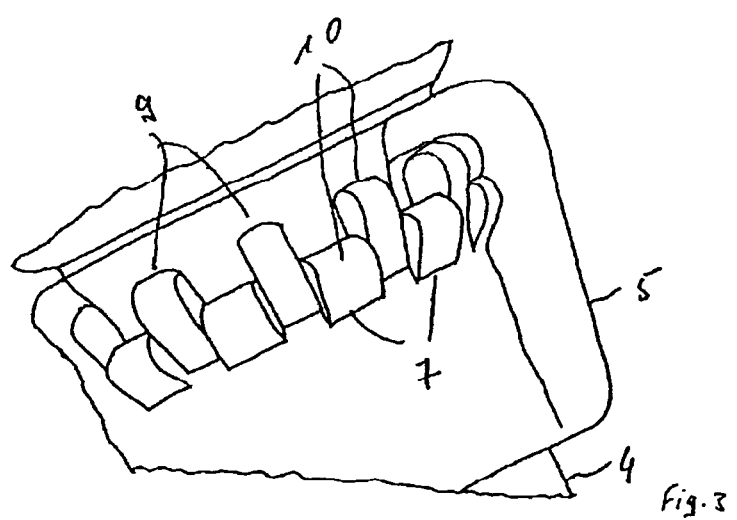
Figure 4:
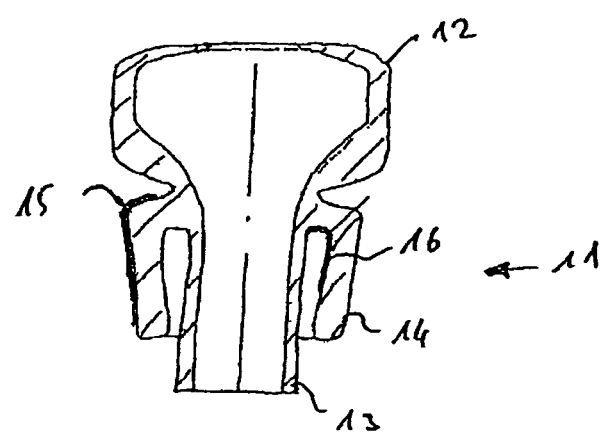
Figure 5:
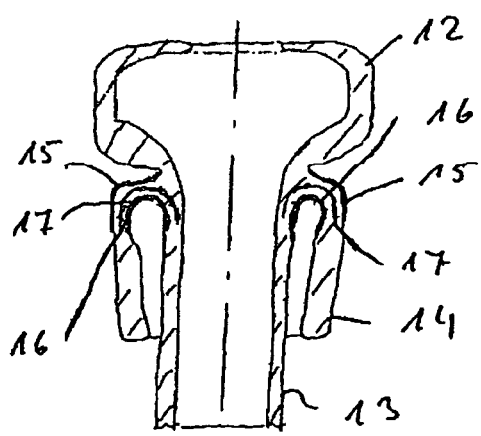
Figure 6:
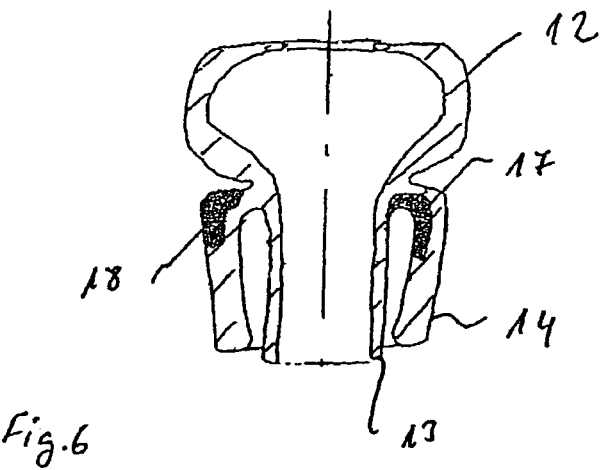
Figure 7:
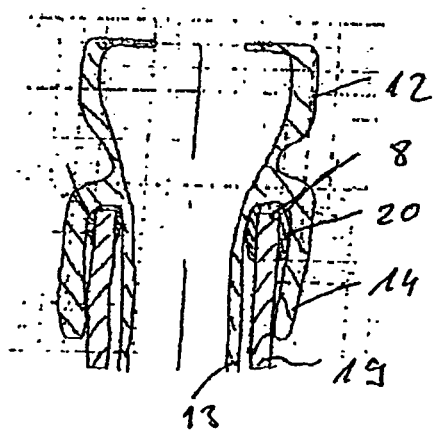
Figure 8:
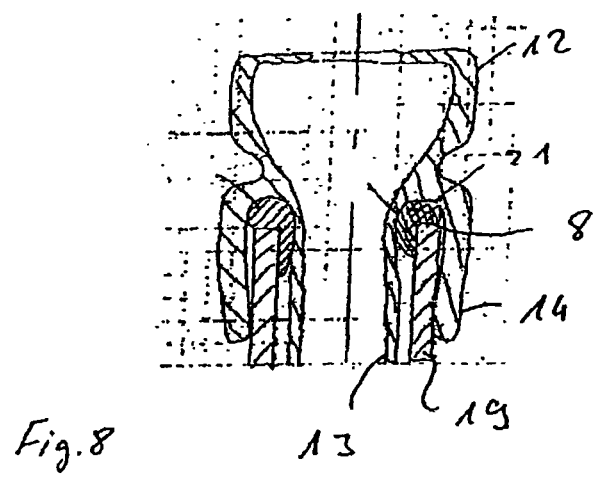
Figure 9:
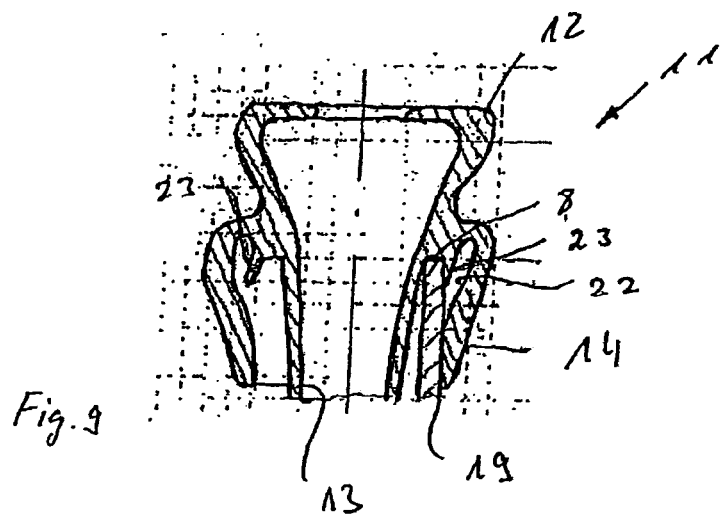

FIG. 1 shows a first practical example in cross-section,
FIG. 2 is a schematic illustration of a development of the holding rim,
FIG. 3 is a perspective view of the holding rim,
FIG. 4 shows schematically a second practical example of a teat cup liner in cross-section,
FIG. 5 shows a third practical example of a teat cup liner in cross-section,
FIG. 6 is a cross-sectional representation of a fourth practical example of a teat cup liner,
FIG. 7 is a cross-sectional representation of a fifth practical example of a teat cup liner,
FIG. 8 shows a teat cup liner with sleeve in cross-section, and
FIG. 9 shows a further practical example of a teat cup liner in cross-section.

DETAILED DESCRIPTION OF THE PREFERRED EMBODIMENTS

In FIG. 1 a teat cup liner 1 for use in a milking cup is shown schematically. The teat cup liner 1 has a head part 2. The head part 2 has an insertion opening 3 for a teat of an animal. The representation of the head part 2 is schematic. The design and execution of the head part may be various.

The head part 2 is attached to a shaft part 4. A holding rim 5 is provided below the head part 2. The holding rim 5 surrounds the shaft part 4. A sleeve 6 is provided between the shaft part 4 and the holding rim 5. The holding rim 5 lies on the outer lateral surface of the sleeve 6 and attaches the teat cup liner to the sleeve 6 at least partly.

In the practical example shown, the teat cup liner has recesses 7. The recesses 7 extend partly in the circumferential direction of the holding rim 5. They are designed to lie opposite to the end face 8 of the sleeve 6. The end face 8 of the sleeve 6 preferably lies against the region that is between the recesses 7.

FIG. 2 shows schematically a development of the holding rim, specifically of the region in which the end face 8 of the sleeve 6 lies against the teat cup liner. Recesses 7 are provided, which are distributed on an imaginary circumference. The recesses 7 are arranged in an equidistant manner to one another. They form a first set of recesses. The representation according to FIG. 2 shows further recesses 9. The recesses 9 are arranged in an equidistant manner to one another. They form a second set of recesses. The recesses of the first set and the recesses of the second set are displaced with respect to one another in the circumferential direction so that at least one recess 9 of the second set is provided between two neighboring recesses 7 of the first set. The recesses of the first set and the recesses of the second set can also be displaced in the axial direction. It is possible for the recesses 7, 9 to overlap partially.

Such a design of the teat cup liner is shown in FIG. 3, whereby FIG. 3 shows the contour of recesses 7, 9. The recesses 7, 9 are designed alternately and they overlap partly. They have a cross-section that expands in the axial direction, in the direction of head part 2. Hereby a design is preferred in which the recesses transition into a rounded region 10.

The recesses may also have other forms or shapes. It is not absolutely necessary that all recesses have the same shape. It is possible for groups of recesses to be provided that are of different shape and form. Moreover, it is also possible for the recesses to extend into the region of sleeve 6 adjacent to end face 8. Recesses may also be provided that are designed to lie opposite to an end region of the sleeve 6.

FIGS. 4 to 9 show further embodiments of the teat cup liner. In these embodiments of the teat cup liner, the representation of the recesses was omitted for the sake of clarity. However, it is also possible for the teat cup liners shown in FIGS. 4 to 9 to be manufactured without recesses. These embodiments of the teat cup liner without recesses may also, themselves, be considered essential for the invention.

FIG. 4 shows a teat cup liner 11 with a head part 12 and a shaft part 13. The shaft part 13 is surrounded by a holding rim 14 which is designed below the head part 12. It can be seen from the representation that an elastic layer 15 is provided on the outer lateral surface of the holding rim, especially in the shoulder region there, designed in such a way that it damps the effects of forces on the teat cup liner. Alternatively or additionally, a layer 16 may be provided in the inner region of the holding rim 14. The layer 15 or 16 may be manufactured with the teat cup liner using a two-component injection method.

FIG. 5 shows still another variation of a teat cup liner. The teat cup liner has a conventional structure with a head part 12, a shaft part 13 and a holding rim 14. It can be seen from the representation according to FIG. 5 that especially in the shoulder region of the holding rim 14 another layer 17 is provided. The layer 17 can be designed, for example, in the form of a film, which is placed into the mold. It is also possible to create the layer 17 in the form of a ring.

There is also the possibility that only layer 17 is provided. Layer 17 can be manufactured with the teat cup liner using a two-component injection method.

FIG. 6 shows an even further embodiment of a teat cup liner with a head part 2, a shaft part 13 and a holding rim 14. The holding rim 14 has regions 17, 18, which are designed to dampen impact. These regions may consist of a material that is preferably softer than the material of the teat cup liner. Especially, the regions should be designed in such a way that these will exhibit an improved puncture resistance in the sense that when the forces occur they will not cause damage to the teat cup liner in the region of the end face of the sleeve and of the teat cup liner. The regions or individual regions may be formed from a foam.

FIGS. 7 and 8 show two additional practical examples of a teat cup liner. The teat cup liners have a head part 12 and a shaft part that is connected to the head part 12. The shaft part 13 is surrounded by a holding rim 14. A sleeve 19 is provided between the shaft part 13 and the holding rim 14. The end face 8 of the sleeve 19 is covered at least partly by a profile, especially by a profiled cord 20. Thus, the profile that is especially made of rubber forms a damping element. The profile may be coated with polyurethane or another plastic. It is also possible for the profile to have hollow chambers that are filled with a medium, especially air.

Instead of using a profile 20 or in addition to using a profile 20, there is also the possibility of designing the end face 8 with a border in such a way that high surface pressures between the teat cup liner and the sleeve are avoided.

In the practical example shown in FIG. 8, an inner ring 21 is arranged between the teat cup liner and the end face 8 of the sleeve 19. The end face 8 of the sleeve 19 is covered by the inner ring 21. It also lies against the end face. The inner ring is designed so that it can expand both in the radial direction as well as in the axial direction of the teat cup liner when forces act from the outside, especially on the holding rim 14. The inner ring can be placed as an insert part before the injection of the silicone into the tool. It can be designed as a two-component part. Optionally, the inner ring can be a rubber-metal component with a vulcanized border.

FIG. 9 shows a teat cup liner 11 with a head part 12. A shaft part 13 joins onto the head part 12. The shaft part 13 is surrounded by a holding rim 14. A recess 22 is provided in the region between the holding rim 14 and the shaft part 13 and this recess extends in the circumferential direction of the holding rim 14. The recess 22 is partially delineated by a lip 23. The lip 23 is designed so that it rests on the end region of a sleeve 19 when the teat cup liner is joined to the sleeve. The teat cup liner rests on the end face 8 of the sleeve. The recess 22 forms an air pillow through which impacts, for example, the unit falling on the floor, are damped. The recess 22 is designed so that essentially the surface pressure of the material of the rubber will not exceed a critical value.

With the aid of the teat cup liner according to the invention and the milking cup according to the invention, damage to the teat cup liner by impact, stepping on it by a cow, falling of the milking machine or similar, is essentially avoided.

The invention claimed is:

1. A teat cup liner for use with a teat cup, the teat cup having an upper end the teat cup liner comprising:
a head defining an opening for a teat of an animal;
a shaft joined to the head at a first location; and
a holding rim joined to the head at a second location spaced apart from the first location to define a force dampening region therebetween and the force dampening region defines a plurality of circumferentially spaced apart recesses opposite an upper end face of the teat cup, and the holding rim at least partially surrounds and is spaced apart from the shaft.

2. The teat cup liner according to claim 1, wherein the recesses are spaced apart substantially equidistant from one another.

3. The teat cup liner according to claim 1, wherein at least two of the recesses are further spaced apart from one another in a substantially axial direction of the teat cup liner.

4. The teat cup liner according to claim 1, wherein the recesses include a first set of recesses and a second set of recesses, and the first set of recesses and the second set of recesses are spaced apart in an axial direction, and at least one recess of the second set is disposed at least partially between two recesses of the first set.

5. The teat cup liner according to claim 1, wherein the radial cross-section of at least one recess increases in size from a lower portion that is away from the head part to an upper portion that is closer to the head part.

6. The teat cup liner according to claim 1, wherein at least one recess has a cross-section in a radial direction that is substantially triangular in shape.

7. The teat cup liner according to claim 1, and further comprising:
an elastic layer joined to the holding rim.

8. The teat cup liner according to claim 7, wherein the teat cup liner and the elastic layer are manufactured by a two-component injection process.

9. A teat cup and teat cup liner assembly, the assembly comprising:
a teat cup an upper end; and
a teat cup liner joined to the teat cup, and the teat cup liner comprises:
a head defining an opening for a teat of an animal;
a shaft joined to the head at a first location; and
a holding rim joined to the head at a second location spaced apart from the first location to define a force dampening region therebetween and the force dampening region defines a plurality of circumferentially spaced apart recesses opposite an upper end face of the teat cup, and the holding rim at least partially surrounds and is spaced apart from the shaft and the teat cup.

10. The teat cup and teat cup liner assembly according to claim 9, wherein the recesses are spaced apart substantially equidistant from one another.

11. The teat cup and teat cup liner assembly according to claim 9, wherein at least two of the recesses are further spaced apart from one another in a substantially axial direction of the teat cup liner.

12. The teat cup and teat cup liner assembly according to claim 9, wherein the recesses include a first set of recesses and a second set of recesses, and the first set of recesses and the second set of recesses are spaced apart in axial direction, and at least one recess of the second set is disposed at least partially between two recesses of the first set.

13. The teat cup and teat cup liner assembly according to claim 9, wherein the radial cross-section of at least one recess increases in size from a lower portion that is away from the head part to an upper portion that is closer to the head part.

14. The teat cup and teat cup liner assembly according to claim 9, wherein at least one recess has a cross-section in a radial direction that is substantially triangular in shape.

15. The teat cup liner according to claim 9, and further comprising:
   an elastic layer joined to the holding rim.
16. The teat cup liner according to claim 15, wherein the teat cup liner and the elastic layer are manufactured by a two-component injection process.

* * * * *